United States Patent [19]

Swars

[11] Patent Number: 4,946,822

[45] Date of Patent: * Aug. 7, 1990

[54] CATALYST CARRIER BODY HAVING A SUPPORTING WALL AND A METHOD FOR PRODUCING THE SAME

[75] Inventor: Helmut Swars, Bergisch Gladbach, Fed. Rep. of Germany

[73] Assignee: Interatom GmbH, Bergisch Gladbach, Fed. Rep. of Germany

[*] Notice: The portion of the term of this patent subsequent to Feb. 7, 2006 has been disclaimed.

[21] Appl. No.: 267,075

[22] Filed: Dec. 8, 1988

Related U.S. Application Data

[62] Division of Ser. No. 48,574, Apr. 11, 1987, Pat. No. 4,803,189.

[30] Foreign Application Priority Data

May 12, 1986 [DE] Fed. Rep. of Germany ....... 3615902
Aug. 11, 1986 [DE] Fed. Rep. of Germany ....... 3627224

[51] Int. Cl.$^5$ ............................................. B01J 32/00
[52] U.S. Cl. ..................................... 502/439; 502/527
[58] Field of Search ................. 502/439, 527; 428/116

[56] References Cited

U.S. PATENT DOCUMENTS

| | | | |
|---|---|---|---|
| 3,597,165 | 8/1971 | Keith et al. ...................... | 23/288 F |
| 4,220,625 | 9/1980 | Toh et al. ........................ | 502/527 X |
| 4,433,064 | 2/1984 | Pignon ............................ | 502/527 X |

FOREIGN PATENT DOCUMENTS

| | | |
|---|---|---|
| 0049489 | 4/1982 | European Pat. Off. . |
| 0056435 | 7/1982 | European Pat. Off. . |
| 0121174 | 10/1984 | European Pat. Off. . |
| 0121175 | 10/1984 | European Pat. Off. . |
| 0186801 | 7/1986 | European Pat. Off. . |
| 2727967 | 1/1979 | Fed. Rep. of Germany . |
| 2856030 | 6/1980 | Fed. Rep. of Germany . |
| 2902779 | 7/1980 | Fed. Rep. of Germany . |
| 3312944 | 10/1984 | Fed. Rep. of Germany . |
| 2214818 | 8/1974 | France . |

*Primary Examiner*—W. J. Shine
*Attorney, Agent, or Firm*—Herbert L. Lerner; Laurence A. Greenberg

[57] ABSTRACT

A catalyst carrier body and a method for producing the same, includes layers of textured curved metal sheets through which a fluid can flow, a jacket in which the curved metal sheets are disposed, and at least one supporting wall disposed in and firmly joined to the jacket forming a supporting structure for the body, the curved metal sheets being individually secured to the supporting walls for absorbing radial expansions of the supporting structure through changes in the curvature of the sheets.

26 Claims, 9 Drawing Sheets

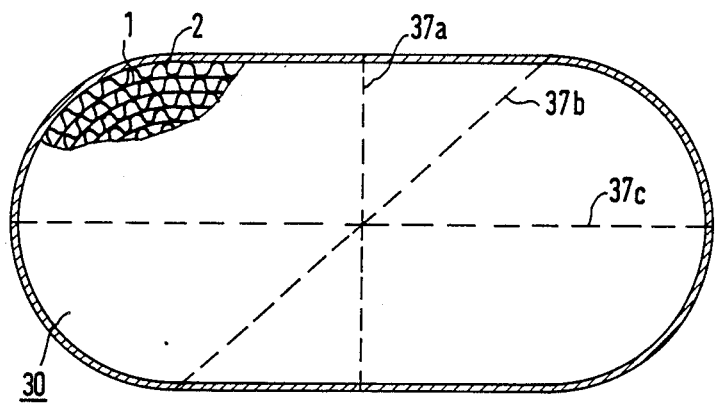
FIG 3
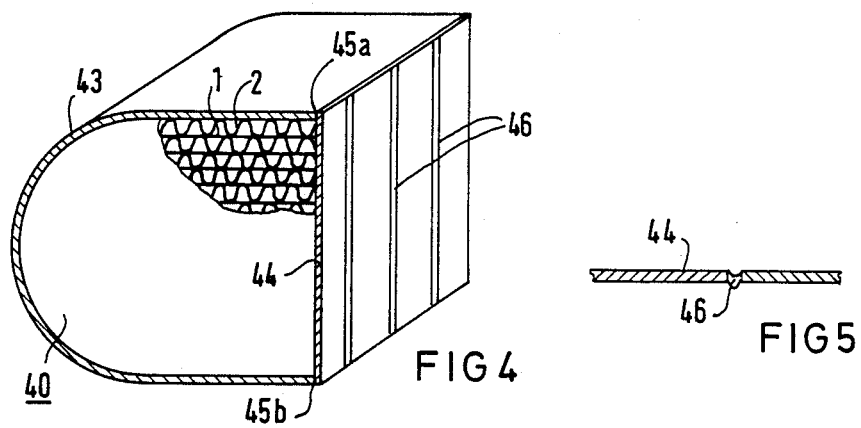
FIG 4
FIG 5
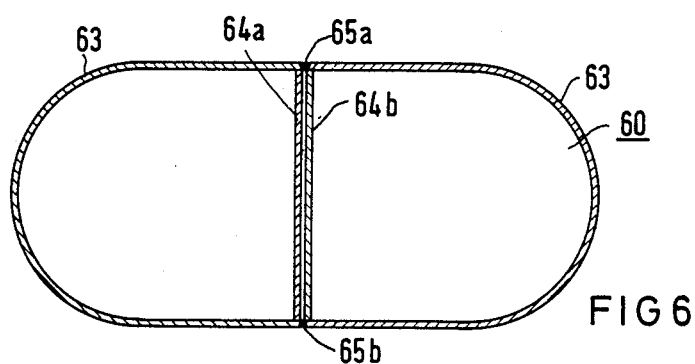
FIG 6

CATALYST CARRIER BODY HAVING A SUPPORTING WALL AND A METHOD FOR PRODUCING THE SAME

This is a division of Ser. No. 048,574, filed May 11, 1987, now U.S. Pat. NO. 4,803,189.

The invention relates to a metal honeycomb body, especially a catalyst carrier body through which a fluid can flow, the body being laminated or wound from textured metal sheets and accommodated in a jacket, as well as a method for the production thereof.

The production of honeycomb-like bodies by alternating layers of textured metal sheets, is known in the art. Preferably the layers are in the form of one smooth sheet alternating with one corrugated sheet. The shape of the corrugation, for example sinusoidal, trapezoidal, omega-shaped or zig-zagged, does not play a decisive role concerning the subject matter of the present invention. Furthermore, both sheet metal layers can be textured in any form. Corresponding honeycomb bodies and methods for producing them are described, for example, in European Patent No. 0 049 489, European Patent No. 0 056 435, German Published, Non-Prosecuted Application DE-OS 29 02 779, European Patent Application Serial No. 0 186 801 or German Published, Non-Prosecuted Application DE-OS 28 56 030.

It is also known from various publications, such as European Patent Applications Serial Nos. 0 121 174 and 0 121 175 or German Published, Non-Prosecuted Application DE-OS 33 12 944, that when such honeycomb bodies are secured in a jacket tube, problems can arise because of alternating thermal stresses and various other effects.

Various solutions proposed for overcoming these problems relate to the use of a more elastic structure of the honeycomb body and various special bonding or joining techniques. Although the stresses can be controlled within certain limits in this manner, they are still not eliminated.

It is accordingly an object of the invention to provide a metallic honeycomb body, especially a catalyst carrier body having a supporting wall and a method for producing the same, which overcomes the hereinafore-mentioned disadvantages of the heretofore-known methods and devices of this general type and in which alternating thermal stresses do not lead to particular strains on the joined connection points.

With the foregoing and other objects in view there is provided, in accordance with the invention, a catalyst carrier body or honeycomb body, comprising layers or windings of textured curved or bent metal sheets through which a fluid can flow, a jacket in which the curved metal sheets are disposed, and at least one supporting wall and/or partial segments of the jacket disposed in and firmly joined to the jacket forming a supporting structure for the body, the curved metal sheets being secured individually or together as composite bodies to the supporting walls for absorbing radial expansions of the supporting structure through changes in the curvature of the sheets and/or by expansion seams between the jacket parts and the metal sheets or between the metal sheets or composite bodies among one another.

The decisive concept in the present invention is that the individual layers of the honeycomb structure no longer absolutely need to be connected to one another in a self-supporting manner. Instead, at least one supporting wall and/or sections of the jacket take on this function and the individual layers are individually retained by the fastening thereof to the supporting wall and/or jacket. Since the individual layers are at the same time supposed to be curved, this configuration is no longer comparable with bodies made of stacks of individual flat layers, in which the layers are also partly secured to a jacket tube at both ends. Smooth layers even then undergo tensile strain, and to produce round or oval cross sections, different lengths of the individual sheet-metal layers and different fastening angles at the jacket tube are required, which presents additional difficulties. By comparison, in the sheet-metal layers curved in accordance with the invention, an excessive tensile strain need no longer be expected even for smooth sheet-metal layers and for many conceivable forms of the cross-sectional surface area, the disposition of the supporting walls additionally makes it possible, for instance, to have approximately right angles between the individual layer ends and the supporting wall or jacket. Free layer ends that could vibrate are also avoided.

As will be described in further detail in conjunction with the drawing, it depends on the structural shape and size of the honeycomb body whether one supporting wall or a plurality of walls must be provided and how these walls can form a supporting structure with sections of the jacket.

In accordance with another feature of the invention, the jacket has a given axial length and a given diameter, and the supporting walls extend over a portion of the given axial length and/or in radial direction over a portion of the given diameter.

In accordance with a further feature of the invention, the curved metal sheets are spirally wound and are joined to one another at least in some regions thereof to form a composite body, and the at least one supporting wall produces a single connection between the jacket and the composite body.

In accordance with an added feature of the invention, the fluid flows through the layers of curved metal sheets in a given direction, the sheets contact the supporting structure at given points of contact, and the sheets have slits formed therein substantially at right angles to the given flow direction in the vicinity of the given points of contact.

In accordance with an additional feature of the invention, all of the sheets have a U, V or circular segment-shape and have ends each being joined to the jacket or to the at least one supporting wall, and the curved sheets optionally have legs with different lengths.

In accordance with yet another feature of the invention, the the at least one supporting wall divides the jacket and the curved sheets into at least two independent segments. In particular, the use of supporting walls in the interior of a catalyst carrier body as provided in this manner makes it possible to divide the catalyst carrier body into two or more independent segments, which in motor vehicles having multiple-pipe exhaust systems can be highly advantageous. In such a case, the individual independent segments can be associated with the individual exhaust pipes by a suitable pipe layout. Additionally, the supporting walls in the interior virtually do not hinder the flow of exhaust gas at all, even with single-pipe exhaust systems, because the small cross-sectional area thereof plays virtually no role at all.

In accordance with yet a further feature of the invention, the at least one supporting wall joined to the jacket is in the form of means for stabilizing the jacket against deformation. A supporting wall of this kind in the interior of a catalyst carrier body can also stabilize a flattened cross section particularly well against deformation that would, for instance, be caused by overpressure. A supporting wall of this kind, serving as a connection between opposed sides of a jacket in a flattened catalyst carrier body, prevents the sides from bulging outward if there is elevated internal pressure, so that a particularly thick jacket tube is no longer needed for absorbing such forces.

A further particularly important advantage of the honeycomb body with supporting walls according to the invention is that joined connections no longer necessarily have to be provided between the individual sheet-metal layers. At least for brazed connections, this has the advantage that the entire honeycomb body no longer needs to be heated in a brazing furnace. Instead, only the supporting walls and the area around them need to be heated in a purposeful manner for brazing. Since the heating of an entire honeycomb body is extremely tedious, but heating of a supporting wall can be accomplished very quickly, this has the advantage of saving both time and energy. In general, heating the supporting walls can be accomplished without a furnace, by means of contact with a heated surface, by thermal radiation, by electrical current, for example induced current, or by means of a laser. Since the supporting wall can furthermore already be provided with brazing material prior to its insertion, further considerable advantages are also obtained.

In addition, the connections between the layers and the supporting wall do not necessarily have to be brazed, because they are subject to virtually no tensile strain. On one hand, welded connections that are capable of withstanding less stress can therefore be used, such as connections produced by laser welding. On the other hand, it is even possible to provide purely mechanical form-locking connections. Combinations of all types of bonds or connections are possible. Form-locking connections can be accomplished by means of grooves or protrusions in the supporting walls and corresponding complementary shapes in the individual layers. Since exhaust gas flows through catalyst carrier bodies parallel to the individual layers, forces act primarily in this direction.

In accordance with yet an added feature of the invention, the layers of the curved sheets are bent in a substantially U or V-shape defining two ends each being secured on the same side of the at least one supporting wall or on the same side of a jacket section, if the jacket is divided into sections.

In accordance with yet an additional feature of the invention, the layers of the curved sheets are curved into a substantially closed shape having two ends each being secured to different sides of the at least one supporting wall.

In accordance with still another feature of the invention, the at least one supporting wall is in the form of a plurality of supporting walls, and at least one of the layers of the curved sheets is curved from one of the supporting walls to another of the supporting walls and has ends secured to the supporting walls.

In accordance with still a further feature of the invention, the curved sheets of the layers are secured to the at least one supporting wall by a brazed or welded or form-locking connection.

In accordance with still an added feature of the invention, the at least one supporting wall has protrusions formed thereon and grooves formed therein, forming the form-locking connections with the sheets of the layers layers.

In accordance with still an additional feature of the invention, the protrusions and the grooves extend substantially at right angles to the sheets of the layers containing the protrusions and the grooves. Shifting of the individual layers can be reliably prevented by means of protrusions or grooves that extend approximately at right angles to the flow direction. Since the layers cannot move in other directions because they are additionally tightly packed in their housing, a purely mechanical form-locking connection is sufficient for secure retention of the layers. Further provisions in terms of bonding or joining may be required merely to control any vibration that may arise in an individual case. A telescope-like shifting of the layers, which may arise with spiral-wound catalyst carrier bodies in response to excessive strain, is impossible in structures secured according to the invention.

In accordance with again another feature of the invention, the at least one supporting wall has at least one preferably laser welded seam including the sheets of the layers in contact with the at least one supporting wall, which may have a sag at the root thereof forming a form-locking connection.

In accordance with again a further feature of the invention, the sheets of the layers have end surfaces with points of contact, and the sheets are at least partially brazed to one another at the points of contact.

In accordance with again an added feature of the invention, the at least one supporting wall is in the form of a plurality of supporting walls, including supporting walls located inside the jacket and accessible from outside the jacket being at least partly butted or doubled and joined together, such as by welding.

In accordance with again an additional feature of the invention, the jacket and the layers of curved sheets are formed of at least two segments, the segments each being in the form of at least one different spirally-wound cut-apart blank combined in a different manner. The blanks may be flattened and the segments may be deformed.

In accordance with another feature of the invention, at least some of the sheets of the layers of at least some of the segments are shifted relative to one another in telescoping fashion forming conical end surfaces.

The methods according to the invention use a blank that is spirally wound in a conventional manner as the starting product. However, other production methods in which the individual sheet-metal layers are cut to a pattern and suitably deformed are also possible.

With the objects of the invention in view there is also provided a method for producing a honeycomb body, especially a catalyst carrier body, which comprises spirally winding a blank from layers of textured metal sheets with a circular or flattened cross section, in a conventional manner: slitting open the blank or cutting the blank into segments with a saw or other cutting instrument or the like; grinding, smoothing and/or sizing and/or shaping the parting surfaces as desired, for instance in a telescoping shape, if necessary; contacting and joining the ends of the layers at the parting surfaces with a support wall; optionally producing segments, optionally with deformation of the layers and/or of the support wall, and combining the segments into a body having the same shape as originally or a different shape.

Such a body according to the invention is produced from a spirally wound honeycomb blank, of the kind described in the publications cited above as prior art. A blank of this kind can be produced with a circular cross section, but it can also be produced with other cross sections by being wound up on a mandrel of any shape, preferably a cylindrical shape, and then being deformed; flattened cross sections are particularly possible. A honeycomb body produced in this way serves as a finished catalyst carrier body as described in the prior art, for instance, after further joining treatments. According to the present invention, however, the blank is processed further, namely by being slit open or cut apart into segments and provided with supporting walls. Machining of the partition faces may be necessary as an intermediate step, depending on the particular cutting system used and may additionally be used to attain a slight dimensional tolerance or a shape required for form-locking.

Separating a blank into a plurality of segments particularly offers the opportunity to combine the segments again in a later operation into either the original form or, possibly by adding segments of other blanks, into a quite different shape. The variety of shapes that can be produced in a simple manner for catalyst carrier bodies, for example, is increased considerably as a result.

In accordance with another mode of the invention, there is provided a method which comprises flattening the cross section of the blank; cutting the blank apart during the dividing step into two segments along an arbitrary cutting line in accordance with a desired final shape; contacting and joining the ends of the layers of the parting surfaces with a supporting wall or contacting and joining each end of each sheet of the layers at the parting surfaces with a respective supporting wall, optionally after machining and preferably by brazing or welding; and joining the outsides of the supporting wall to a half shell serving as the jacket.

In accordance with a further mode of the invention, there is provided a method which comprises dividing the jacket into two calibrated half shells; surrounding the blank with the two half shells with a precise fit prior to dividing the blank; and firmly retaining the innermost layer with retaining clamps.

In accordance with an added mode of the invention, there is provided a method which comprises combining the segments with the supporting walls thereof into a body by combining segments of blanks of different sizes or shapes into new shapes, optionally after reshaping, and joining the segments together.

In accordance with a concomitant mode of the invention, there is provided a method which comprises slitting open the blank at least once substantially at right angles to the direction of the layers and optionally telescoping the blank; enlarging each slit by inserting a supporting wall folded into a V; firmly connecting the supporting wall by welding, laser welding or brazing, by inserting a hot mandrel into the open side of the V-shaped supporting wall or with a form-locking connection; closing the slit prior to or during the attachment of the jacket tube; and joining the supporting wall to the jacket tube, and preferably placing two surfaces of the supporting wall against each other and joining the two surfaces of the supporting wall to one another.

Furthermore, honeycomb bodies having different cell sizes in individual segments can be produced. The methods disclosed by way of example show only the basic way of producing catalyst carrier bodies according to the invention. Considerable variations in the methods production are within the competence of one skilled in the art. In particular, the selection of the most advantageous shape and number of supporting walls, the methods of joining or bonding between the supporting walls and the sheet-metal layers and between the supporting walls and the jacket parts, depends on the materials used, on the desired shapes and on the existing features of the associated exhaust gas system.

Other features which are considered as characteristic for the invention are set forth in the appended claims.

Although the invention is illustrated and described herein as embodied in a metallic honeycomb body, especially a catalyst carrier body having a supporting wall and a method for producing the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is another view similar to FIG. 1 showing a blank for producing catalyst carrier bodies according to the invention with possible cutting lines;

FIG. 4 is a cross-sectional perspective view of a catalyst carrier body according to the invention, produced from the blank shown in FIG. 3;

FIG. 5 is a fragmentary, longitudinal-sectional view of a welded seam in the supporting wall of FIG. 4:

FIG. 6 is a cross-sectional view of a catalyst carrier body according to the invention that is formed of two segments;

Figure 1:
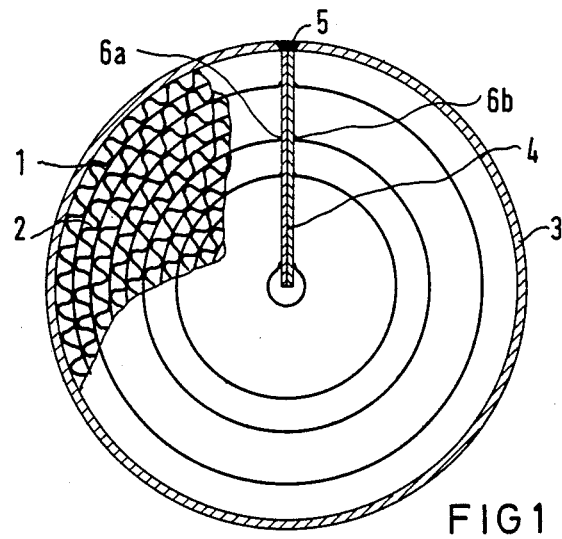
FIG. 1 is a diagrammatic, partly broken-away, cross-sectional view of a catalyst carrier body for a motor vehicle having a circular cross section and one supporting wall.

Referring now to the figures of the drawings in detail and first, particularly, to FIG. 1 thereof, there is seen a a cross section through a spirally wound honeycomb body, formed of alternating layers of smooth metal sheets 1 and corrugated metal sheets 2, in a jacket tube 3. The honeycomb body is penetrated along a plane extending in the radial direction by a supporting wall 4. The supporting wall is firmly joined to the jacket tube 3 at a connection point 5, preferably by being butt-welded. Adjoining sheet-metal layers are secured to both sides of the supporting wall 4 at connection points 6a, 6b. Further connection points for connecting the sheet-metal layers 1, 2 to one another or to the jacket tube 3 are not absolutely necessary for the catalyst carrier body constructed in this way. However, it may be advantageous to connect the metal sheets together. The supporting wall 4 may be double-walled, depending on the method of production with which it was introduced into the wound body, and the two halves resting on one another may be welded or brazed together at the end surfaces.

The supporting wall 4 in FIG. 1 may also be dimensioned in such a way that it extends over only a small portion of the axial length of the honeycomb body. Such a form can be produced by slitting a conventional spirally wound body inwardly from one end surface and by inserting a supporting wall. Preferably, the supporting wall 4 then provides the actual connection 5 between the metal sheets 1, 2 and the jacket 3, so that during the expansions thereof, the sheets are independent of the expansion of the material.

Figure 2:
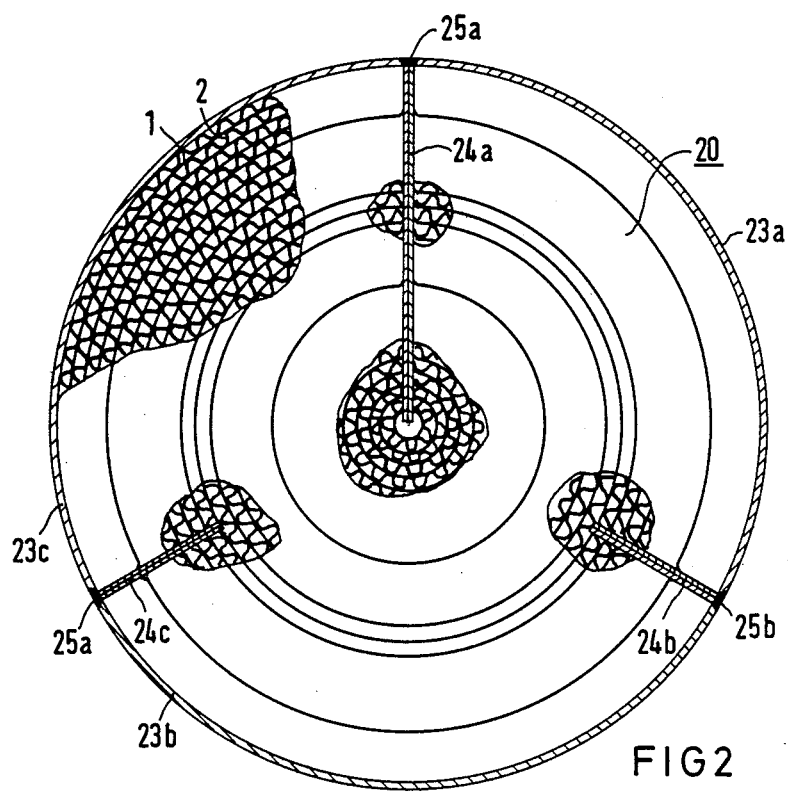
FIG. 2 is a view similar to FIG. 1 of a catalyst carrier body again having a circular cross section, but having three supporting walls because of its larger cross-sectional area.

FIG. 2 shows a cross section through a catalyst carrier body 20 again produced from spirally wound sheets, which however, because of its greater cross-sectional area, has three supporting walls 24a, 24b, 24c for stabilizing purposes. One supporting wall 24a extends in a radial plane as far as the center of the holder body, while the other two supporting walls 24b, 24c are also located in radial planes but only in the vicinity of the outer sheet layers of the catalyst carrier body. This configuration of the supporting walls avoids overly long free-standing portions of the sheet-metal layers 1, 2 and lessens the tendency toward vibration on the part of the body. All three supporting walls 24a, 24b, 24c are connected to the jacket at joining points 25a, 25b, 25c by joining techniques, preferably by being butt-welded, defining three portions 23a, 23b, 23c of the catalyst carrier body 20. The two illustrated embodiments of FIGS. 1 and 2 have a further advantage that has not yet been mentioned, which is that in principle they can be coated with catalytically active material prior to the attachment of the jacket, as soon as the connections between the sheet-metal layers 1, 2 and the supporting wall 4 or 24a have been made. Since the layers 1, 2 no longer need to be joined to the jacket tube, they can also be coated before the jacket is attached, because all that still needs to be done is that the supporting walls have to be welded or otherwise joined to the jacket. This advantage is partly obtained in the following illustrated embodiments as well, depending on the intended sequences of method steps.

FIG. 3 shows a blank 30 produced in a conventional manner with a flattened cross section, as an example of the possibilities offered by the present invention. A blank of this kind can be wound on a flat mandrel, for instance, or it may be wound on a round mandrel and later pressed flat. A blank of this kind can also be provided with supporting walls in accordance with FIGS. 1 or 2, or it can be cut apart into twos segments along one of the cutting lines 37a, 37b, 37c shown by way of example. Supporting walls are attached and secured along the partitioning faces, which may optionally be worked even further as well.

In this manner, a segment 40 as shown in FIG. 4 may for instance be produced, in which the sheet-metal layers 1, 2 are secured in a U-shape on a supporting wall 44. The entire segment has a jacket which is formed of one half shell 43 and the supporting wall 44. The half shell 43 and the supporting wall 44 are joined to one another at lines of contact 45a, 45b, preferably by being welded. The joining of the layers 1, 2 to the supporting wall 44 may preferably be done from outside by laser welding. In so doing, a laser beam is moved along intended welding lines 46 over the supporting wall 44 and melts the supporting wall up to the inner surface thereof, producing connections with the layers 1, 2.

As shown in FIG. 5, when this welding operation is carried out in a horizontal location of the supporting wall 44, the resultant welding line or seam 46 can sink inward, producing a sagging root or root face of the seam. As a result, in addition to the welded connection there is a form-locking connection with the layers 1, 2, so that the layers 1, 2 cannot be pressed out of the jacket 43, 44 by the flow of exhaust gas. This form-locking connection, which can also be produced by other methods, eliminates the remaining freedom of movement that the layers 1, 2 previously retained and thus forms a catalyst carrier body which is very stable and yet which has no connections subjected to great alternating mechanical stresses. A form-locking connection is one which is produced by the shape of the parts themselves, as opposed to a force-locking connection which requires force external to the parts.

FIG. 6 diagrammatically illustrates a catalyst carrier body 60 which is made by combining segments shown in FIG. 4.

Supporting walls 64a, 64b in the form of a double wall, are again located in the interior of the overall catalyst carrier body 60 which is formed, so as to divide it into two independent segments, which can be advantageous in particular for dual exhaust systems. Two half shells 63 serving as a jacket may be joined at lines of contact 65a, 65b thereof, so that as seen from the outside, a body corresponding to the blank of FIG. 3 is once again produced. However, this body has a double-walled supporting wall 64a, 64b in its interior, which makes the body substantially more stable. There is no longer any need to be concerned that the flattened sides will be distended due to great internal pressure.

Figure 7:
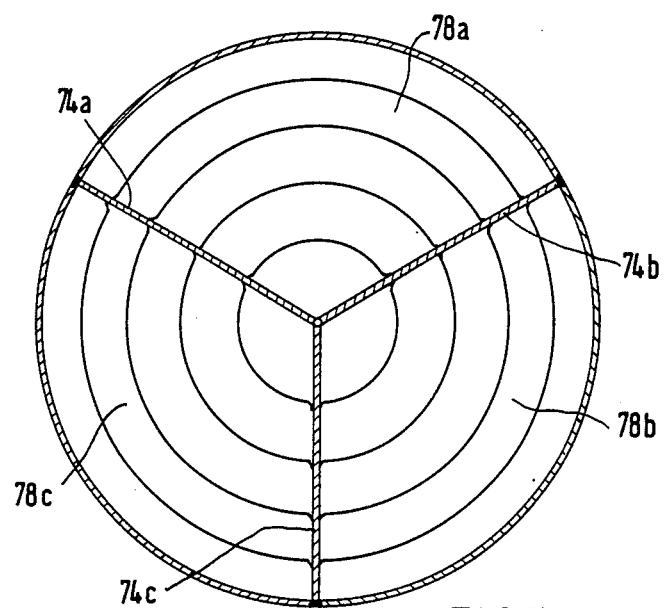
FIG. 7 is a cross-sectional view of a catalyst carrier body having a circular cross section formed of three segments.

For the sake of completeness, FIG. 7 diagrammatically shows a further possibility for the disposition of supporting walls in a catalyst carrier body. Such a body may be divided into a plurality of independent segments 78a, 78b, 78c by a plurality of supporting walls 74a, 74b, 74c, which meet at the center, for example.

Figure 8:
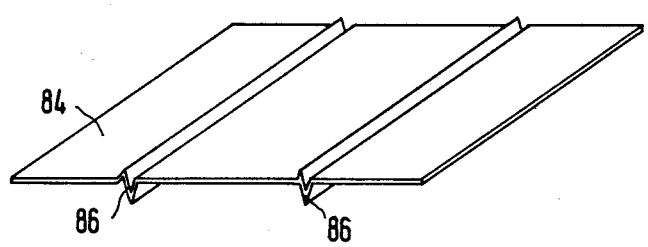
FIG. 8 is a perspective view of a supporting wall provided with protrusions for form-locking connections.

FIG. 8 diagrammatically illustrates a supporting wall 84 prepared for form-locking connections, having beads 86 or other kinds of protrusions toward one or the other side. The very thin sheet-metal layers generally used for catalyst carrier bodies assume the corresponding complementary shape merely by being pressed against the supporting wall 84 and need not be worked in advance. The slight reduction of cross section resulting from a form-locking connection plays virtually no role.

Figure 9:
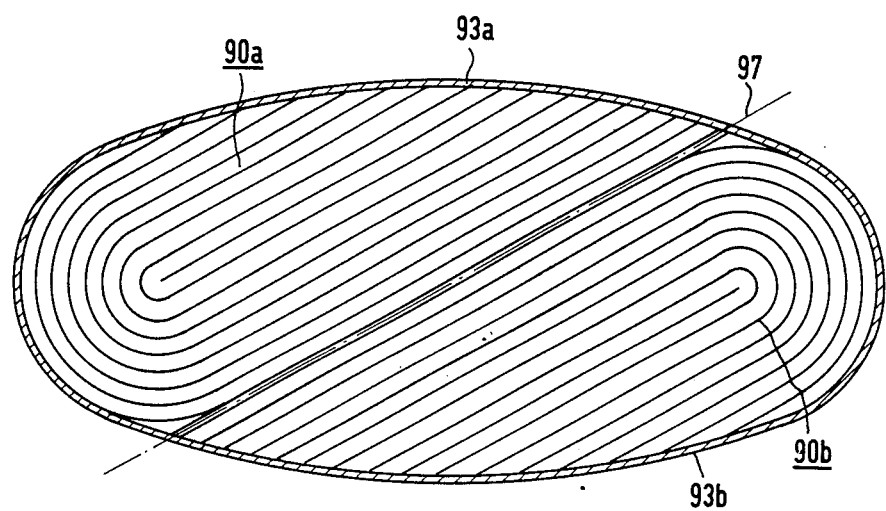
FIG. 9 is a cross-sectional view of a body with a curved supporting structure and FIGS. 10–12 show steps in the production thereof.
Figure 10:
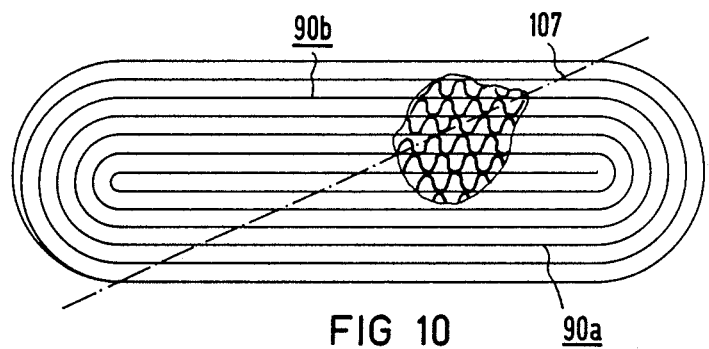
Figure 11:
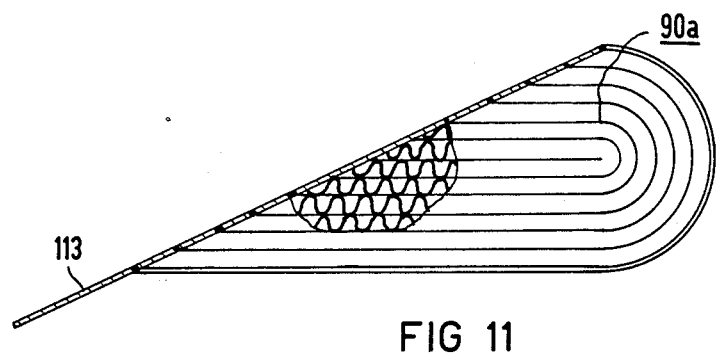
Figure 12:
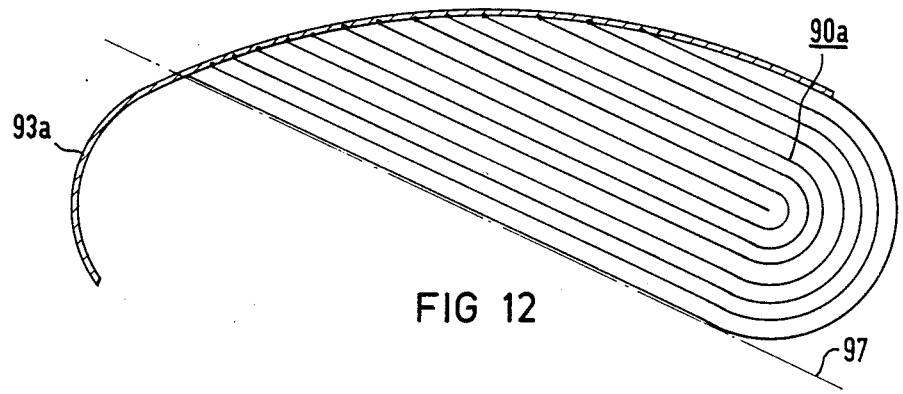

The embodiments described above all have straight supporting walls or supporting structures. As FIGS. 9-12 make clear, this is not absolutely required. However, during the production of bodies 90a, 90b having curved supporting structures 93a, 93b formed of cut-apart blanks, it is generally simpler to first separate the blanks along a straight line 107 seen FIG. 10, to secure the layers to straight supporting walls 113 seen FIG. 11, and to only then bend the walls as seen in FIG. 12, so as to produce new bodies with an expansion seam 97 as seen in FIG. 9.

Figure 13:
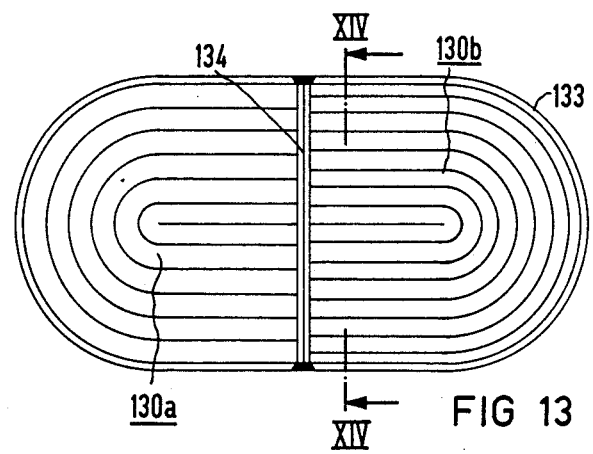
FIG. 13 is an end view of a body with telescoping end surfaces and FIG. 14 is a cross-sectional view thereof taken along the line XIV—XIV in FIG. 13, in the direction of the arrows.
Figure 14:
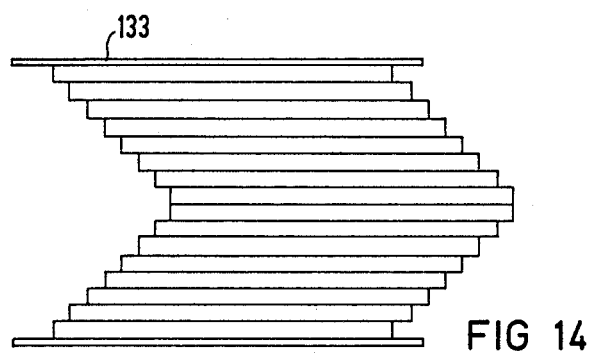

As FIGS. 13 and 14 show, it is also possible in some honeycomb bodies 130a, 130b according to the invention, to produce end surfaces that protrude in telescoping fashion. As compared with the corresponding shape in spirally wound bodies, a telescoping shifting of the individual layers in fact does occur in this case, but the channels do not lose their axial orientation. FIG. 13 shows an end view of a telescoped honeycomb body 130a, 130b having an inner supporting wall 134 and a jacket 133. The drawing additionally shows that the gas-permeable channels in the two segments may have different cross sections. FIG. 14 is a longitudinal section taken through FIG. 13 along the line XIV—XIV, to show the telescoped form more clearly. The supporting wall 134 preferably has a corresponding arrow-like shape. Since the individual layers are independent of one another, however, any other end surface profiles desired can also be produced by correspondingly stepped telescoping.

Figure 15:
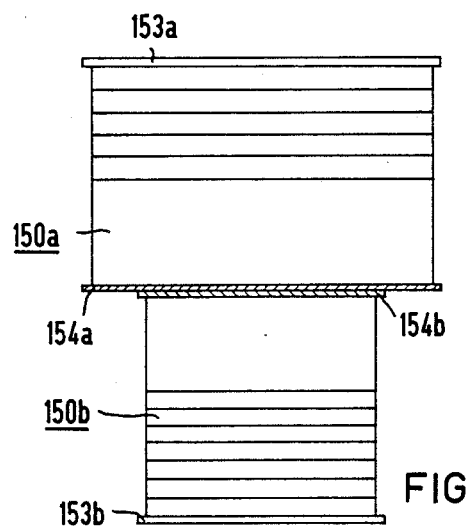
FIGS. 15 and 16 are respective longitudinal and cross-sectional views of a body with another shape.
Figure 16:
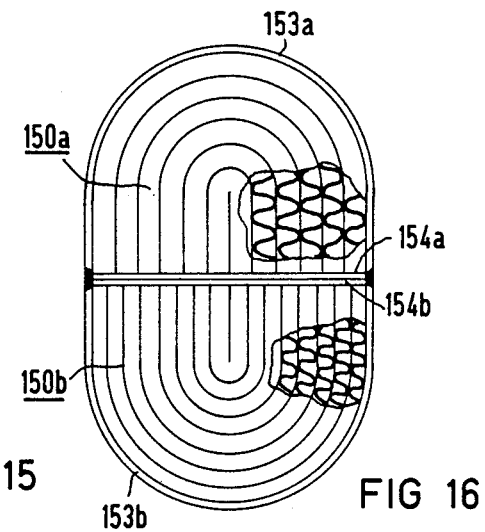

FIGS. 15 and 16 show respective longitudinal and cross-sectional views through a different honeycomb body shape. Besides having a different size of the channel cross sections in two segments 150a, 150b, their axial lengths may be different as well, in order to permit better adaptation to existing available space. A body of this kind is produced, for example, by putting together segments of two flattened honeycomb bodies of different lengths. The jacket thereof is formed of two half shells 153a, 153b and supporting walls 154a, 154b located on the inside are preferably in the form of two layers.

Figure 17:
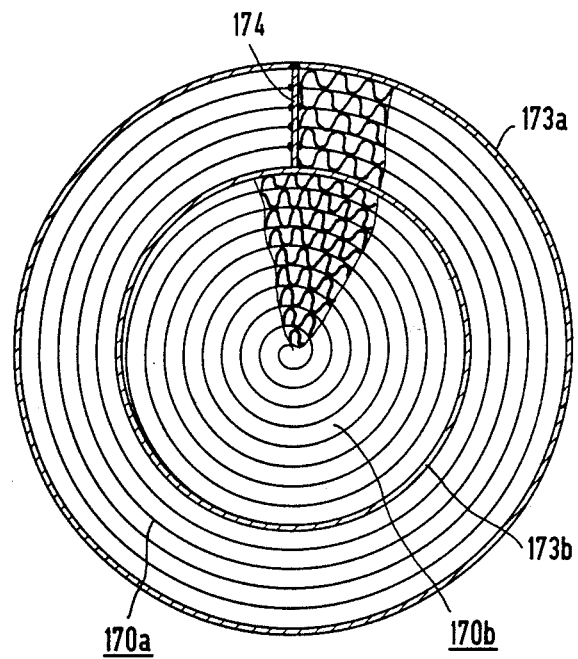
FIG. 17 is a cross-sectional view of a body with inner and outer jackets.

FIG. 17 illustrates another embodiment of the present invention. The interior 170b of the body shown therein is formed of a conventional spirally wound type of structure having a jacket 173b. In order to overcome the problems of expansion, which have greater and greater effects as the diameter increases, the inner body 170b is secured to an outer jacket 173a by means of a supporting wall 174. Furthermore, a region 170a between the two jackets 173a, 173b is also filled with textured metal sheets, which are secured at the ends thereof to the supporting wall 174.

Figure 18:
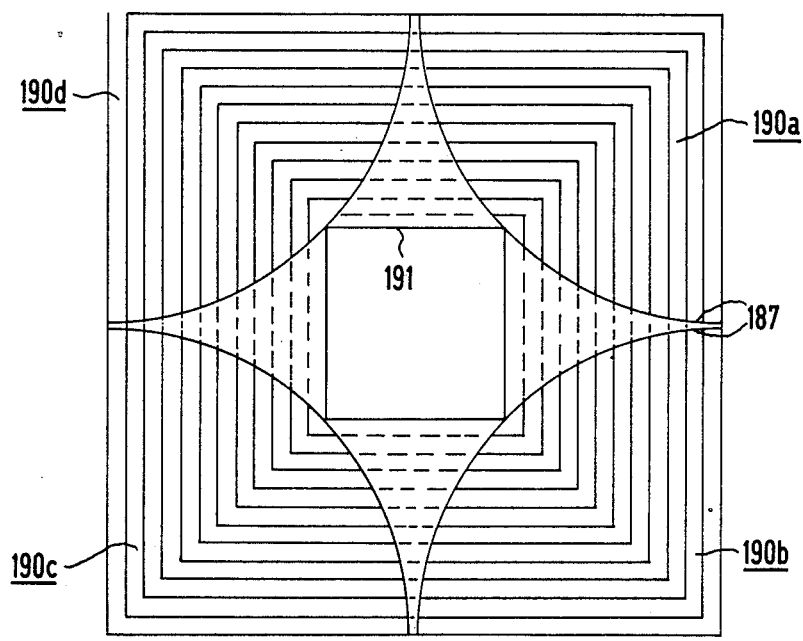
FIGS. 18 and 19 are end-elevational views of a spirally wound body before being cut apart and after being reassembled.
Figure 19:
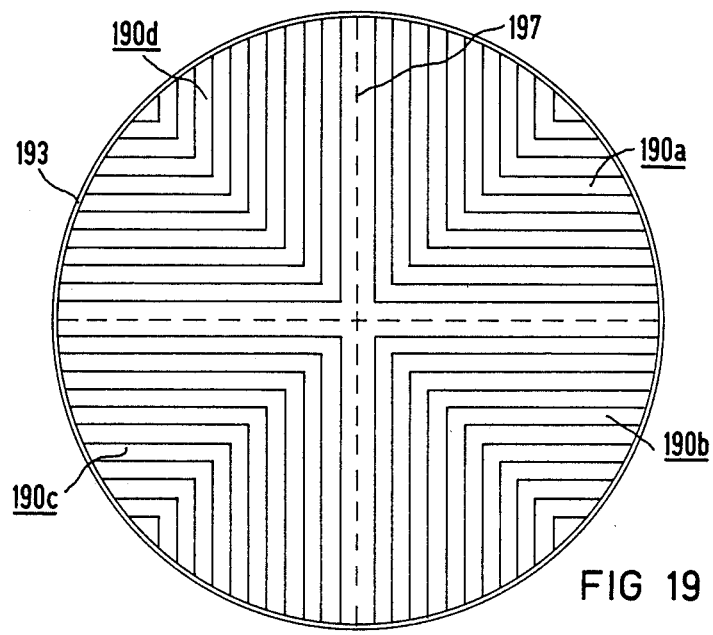

FIGS. 18 and 19 diagrammatically show further basic options presented by the invention. A honeycomb body 190a, 190b, 190c, 190d wound spirally on a square core 191 is cut apart along a line 187, such as by electrocorrosion with a wire or by means of a laser beam, and is recombined to make the body shown in FIG. 19. This body has a jacket 193, to which the ends of the sheets of the individual segments 190a, 190b, 190c, 190d are each joined. A cross-shaped expansion seam 197 permits expansion of the entire body without tensile stress on the connection points.

Figure 20:
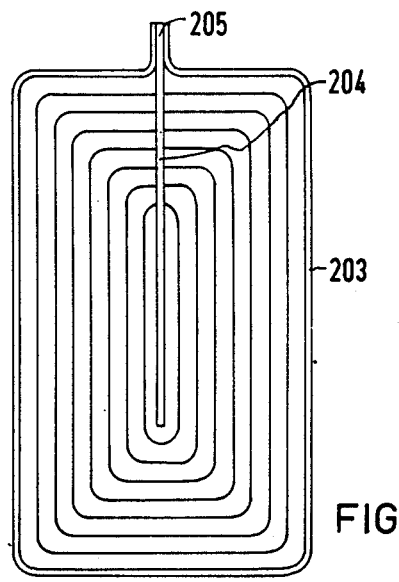
FIGS. 20 and 21 are end-elevational views of rectangular bodies.

FIG. 20 shows a honeycomb body in a rectangular jacket 203, in which the textured sheets are secured to a supporting wall 204. The supporting wall 204 has a connection 205 with flanged-over ends of the jacket 203.

Figure 21:
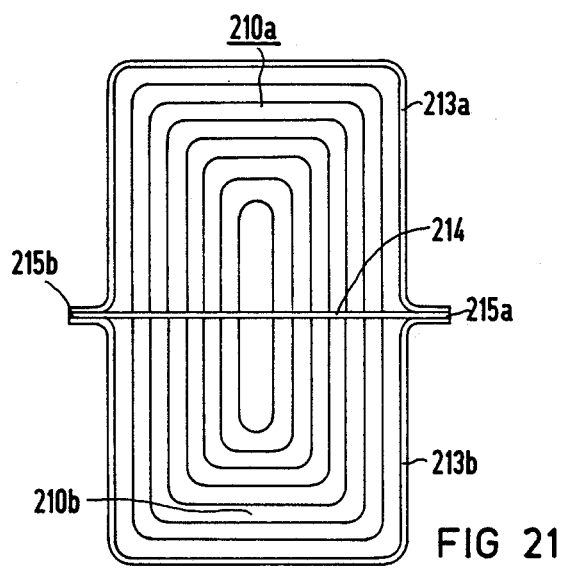

FIG. 21 shows a honeycomb body that is divided by a supporting wall 214 into two segments 210a, 210b. The jacket also is formed of two halves 213a, 213b, which grip the supporting wall 214 with flanged-over ends thereof, so that a joined connection 215a, 215b is easily produced there.

Catalyst carrier bodies according to the invention, which in particular can be produced from wound blanks by the methods described above, have manifold advantages over conventional catalyst carrier bodies and they are particularly variable in shape and in terms of the method of production thereof because of the principle of unstressed mechanical suspension on a supporting wall which they employ. Further embodiments and improvements in terms of shape, material or accessory equipment and so forth, which are suitable for conventional metal catalyst carrier bodies, are in most cases applicable in the embodiments according to the invention as well.

I claim:

1. Catalyst carrier body, comprising a multiplicity of layers of textured curved metal sheets each having two ends, said sheets defining passages between said sheets through which a fluid can flow, and a jacket in which said curved metal sheets are disposed, at least part of said jacket forming a supporting wall to which both of said ends of at least some of said curved metal sheets are individually secured.

2. Catalyst carrier body according to claim 1, wherein all of said curved metal sheets are substantially U-shaped.

3. Catalyst carrier body according to claim 1, wherein fall of said curved metal sheets are substantially V-shaped.

4. Catalyst carrier body according to claim 1, wherein said jacket includes a substantially U-shaped half shell, said half shell and said supporting wall being joined to one another to form said jacket.

5. Catalyst carrier body according to claim 1, wherein said jacket has at least two supporting parts, and including at least two partial segments, each having a multiplicity of said curved metal sheets secured to a respective one of said supporting parts of said jacket.

6. Catalyst carrier body according to claim 5, wherein said at least two partial segments have at least one expansion seam therebetween.

7. Catalyst carrier body according to claim 1, wherein said metal sheets are alternatingly smooth and corrugated.

8. Catalyst carrier body according to claim 1, wherein said curved sheets have legs with different lengths.

9. Catalyst carrier body according to claim 1, wherein said jacket is divided into sections, and said layers of said curved sheets are bent in a substantially U or V-shape defining two ends each being secured on the same side of one of said jacket sections.

10. Catalyst carrier body according to claim 1, wherein said curved sheets of said layers are secured to said at least one supporting wall by a brazed or welded connection.

11. Catalyst carrier body according to claim 1, wherein said at least one supporting wall has at least one welded seam including said sheets of said layers in contact with said at least one supporting wall.

12. Catalyst carrier body according to claim 1, wherein said at least one supporting wall has at least one welded seam including said sheets of said layers in contact with said at least one supporting wall, said welded seam having a sag at the root thereof forming a form-locking connection.

13. Catalyst carrier body according to claim 1, wherein said sheets of said layers have end surfaces with points of contact, and said sheets are at least partially brazed to one another at said points of contact.

14. Catalyst carrier body according to claim 1, wherein said jacket and said layers of curved sheets are formed of at least two segments, said segments each being in the form of at least one different spirally-wound cut-apart blank combined in a different manner.

15. Catalyst carrier body according to claim 14, wherein said blanks are flattened and said segments are deformed.

16. Catalyst carrier body according to claim 1, wherein at least some of said sheets of said layers are shifted relative to one another in telescoping fashion forming conical end surfaces.

17. Catalyst carrier body according to claim 14, wherein at least some of said segments are shifted relative to one another in telescoping fashion forming conical end surfaces.

18. Method for producing a catalyst carrier body, which comprises:
(a) spirally winding a carrier body blank from a multiplicity of layers of textured curved metal sheets having passages between the sheets through which fluid can flow;
(b) placing the curved metal sheets within a jacket;
(c) dividing the blank and the jacket with a cutting instrument forming segments each having sheets with two ends at parting surfaces;
(d) connecting a supporting wall to the jacket in each respective segment; and
(e) contacting and individually joining both ends of at least some of the layers to the supporting wall in each segment.

19. Method according to claim 18, which comprises grinding, smoothing, sizing and shaping the parting surfaces.

20. Method according to claim 18, which comprises telescoping the parting surfaces.

21. Method according to claim 18, which comprises combining the segments into a body having the same shape as originally or a different shape.

22. Method according to claim 18, which comprises deforming the sheets of the layers and recombining the segments into a body.

23. Method according to claim 18, which comprises deforming the supporting wall and recombining the segments into a body.

24. Method according to claim 18, which comprises:
(a) flattening the cross section of the blank;
(b) cutting the blank apart during the dividing step into the segments along an arbitrary cutting line in accordance with a desired final shape; and
(c) joining the outsides of the supporting wall to a half shell of the jacket.

25. Method according to claim 24, which comprises contacting and joining each end of each sheet of the layers at the parting surfaces with a respective supporting wall.

26. Method according to claim 14, which comprises combining the segments with the supporting walls thereof into a body by combining segments of blanks of different sizes or shapes into new shapes, and joining the segments together.

* * * * *